(12) United States Patent
Jenkins et al.

(10) Patent No.: US 9,666,036 B2
(45) Date of Patent: May 30, 2017

(54) SELF-SERVICE FINANCIAL TRANSACTION TERMINAL

(71) Applicants: Randall W. Jenkins, Orrville, OH (US); Songtao Ma, Wadsworth, OH (US); Rani Solic, Munroe Falls, OH (US); Joseph Hartman, North Canton, OH (US); Dave Kraft, North Canton, OH (US); Robert Cole, New Franklin, OH (US); Michael Tirak, Canfield, OH (US)

(72) Inventors: Randall W. Jenkins, Orrville, OH (US); Songtao Ma, Wadsworth, OH (US); Rani Solic, Munroe Falls, OH (US); Joseph Hartman, North Canton, OH (US); Dave Kraft, North Canton, OH (US); Robert Cole, New Franklin, OH (US); Michael Tirak, Canfield, OH (US)

(73) Assignee: Diebold Self-Service Systems, Division of Diebold, Incorporated, North Canton, OH (US)

(*) Notice: Subject to any disclaimer, the term of this patent is extended or adjusted under 35 U.S.C. 154(b) by 0 days.

(21) Appl. No.: 14/882,364

(22) Filed: Oct. 13, 2015

(65) Prior Publication Data

US 2016/0110967 A1   Apr. 21, 2016

Related U.S. Application Data

(60) Provisional application No. 62/063,230, filed on Oct. 13, 2014.

(51) Int. Cl.
*G06Q 40/00* (2012.01)
*G07F 19/00* (2006.01)
*G06F 1/16* (2006.01)

(52) U.S. Cl.
CPC .......... *G07F 19/205* (2013.01); *G06F 1/1601* (2013.01); *G07F 19/20* (2013.01)

(58) Field of Classification Search
CPC .............................. G07F 19/20; G07F 19/207
USPC ....................................................... 235/379
See application file for complete search history.

(56) References Cited

U.S. PATENT DOCUMENTS 7,780,071 B1 * 8/2010 Ramachandran ....... G07F 19/20
                                                      235/375

* cited by examiner

*Primary Examiner* — Seung Lee
(74) *Attorney, Agent, or Firm* — Black, McCuskey, Souers & Arbaugh, LPA

(57) ABSTRACT

An Automated Transaction Machine (ATM) includes a housing with a lower unit and an upper unit including a main portion having a top panel and a display housing extending above the top panel. A display is disposed within the display housing. A control electronics package is disposed in the display housing and including a processor and a plurality of input/output ports.

18 Claims, 8 Drawing Sheets

SELF-SERVICE FINANCIAL TRANSACTION TERMINAL

CROSS-REFERENCE TO RELATED APPLICATIONS

This application claims priority to and the benefit of U.S. Provisional Patent Application No. 62/063,230 filed 13 Oct. 2014, the contents of which are hereby incorporated by reference in their entirety.

BACKGROUND

This relates in general to automated transaction machines (ATMs). For example, such ATMs may include self-service financial transaction terminals for currency or cash dispensing, accepting, or recycling, which are sometimes referred to as "self-service terminals" or simply "terminals".

SUMMARY

This relates more specifically to an Automated Transaction Machine (ATM) that includes a housing with a lower unit and an upper unit including a main portion having a top panel and a display housing extending above the top panel. A display is disposed within the display housing. A control electronics package is disposed in the display housing and including a processor and a plurality of input/output ports.

Various aspects will become apparent to those skilled in the art from the following detailed description and the accompanying drawings.

DETAILED DESCRIPTION

Figure 1:
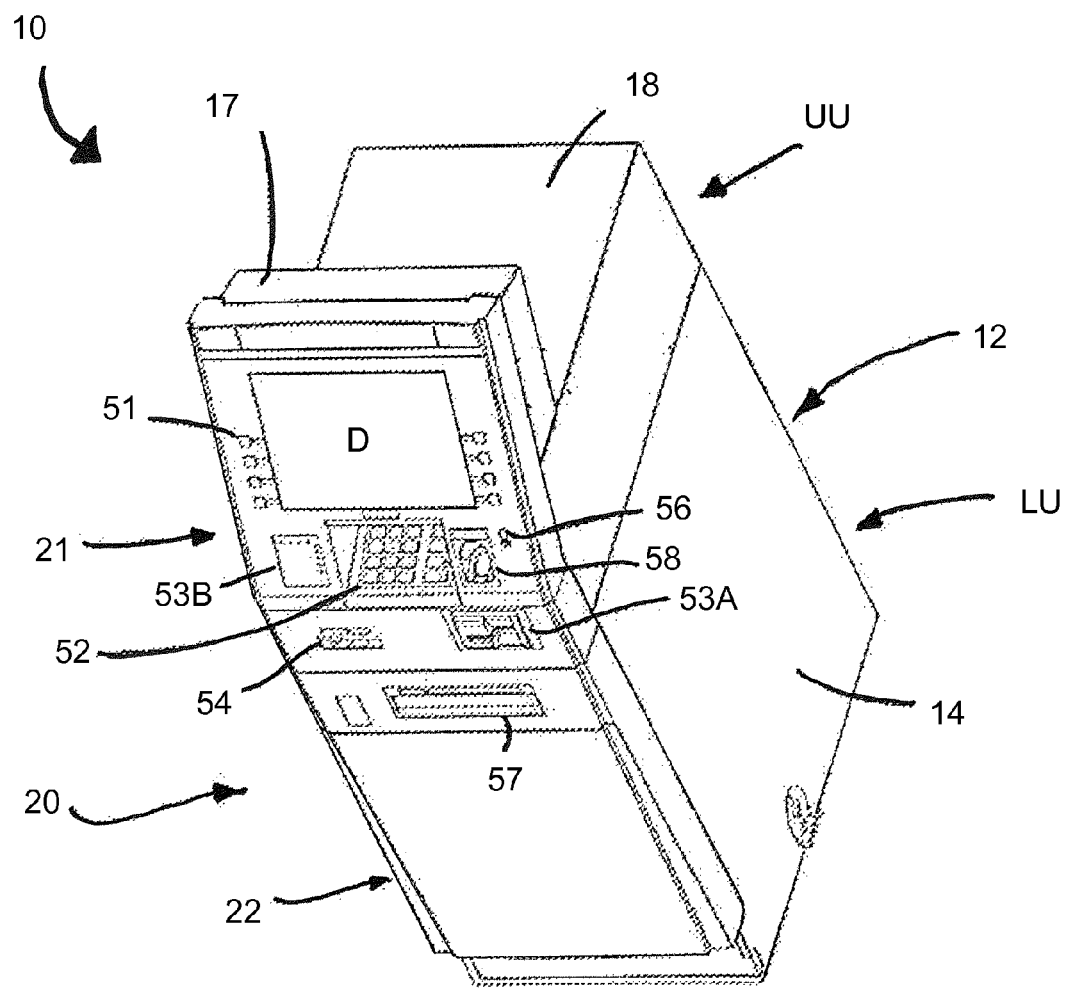
FIG. 1 is a perspective view of an Automated Transaction Machine (ATM) in accordance with one embodiment.
Figure 2:
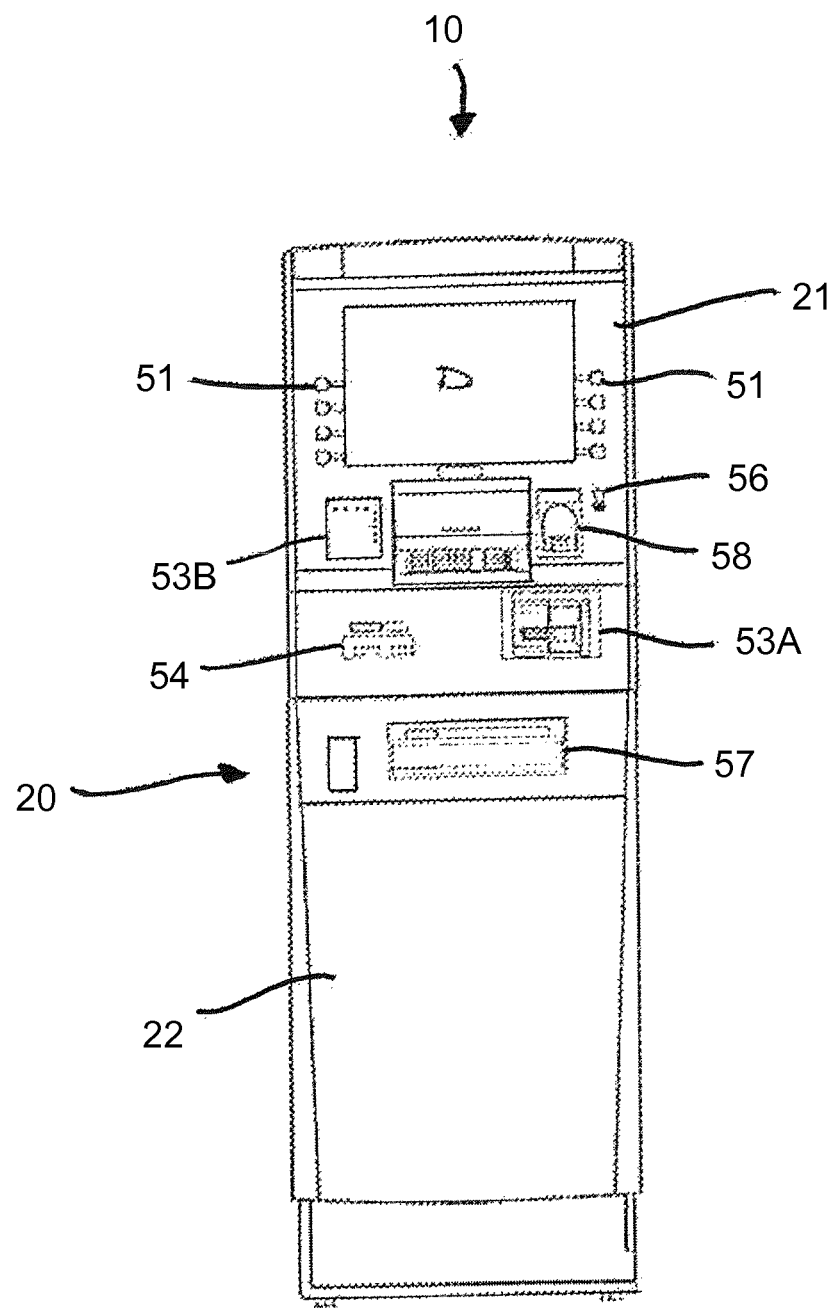
FIG. 2 is a front view of the ATM of FIG. 1.
Figure 3:
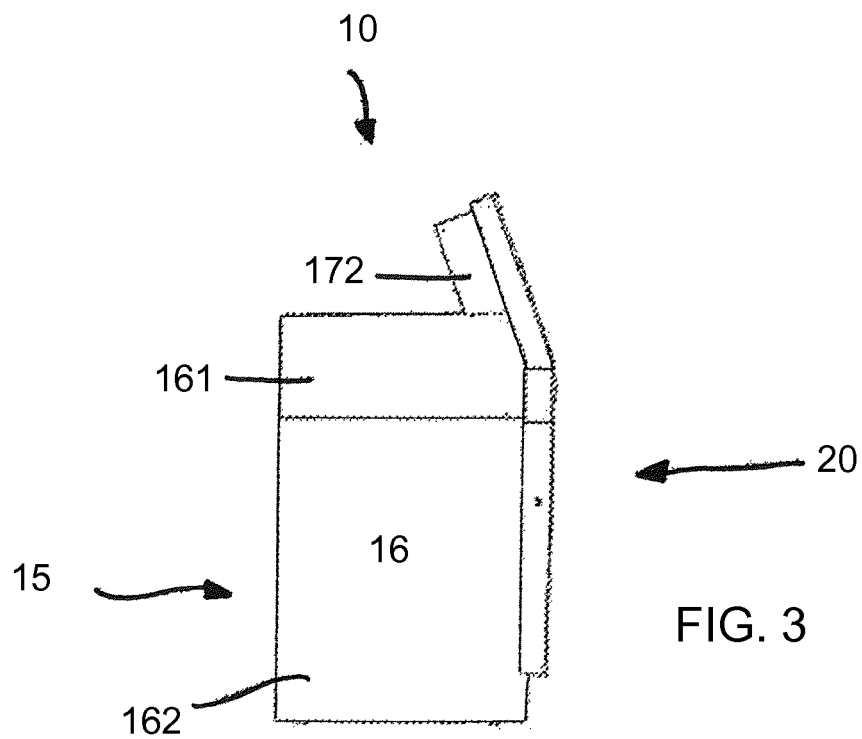
FIG. 3 is a left side view of the ATM of FIG. 1.
Figure 4:
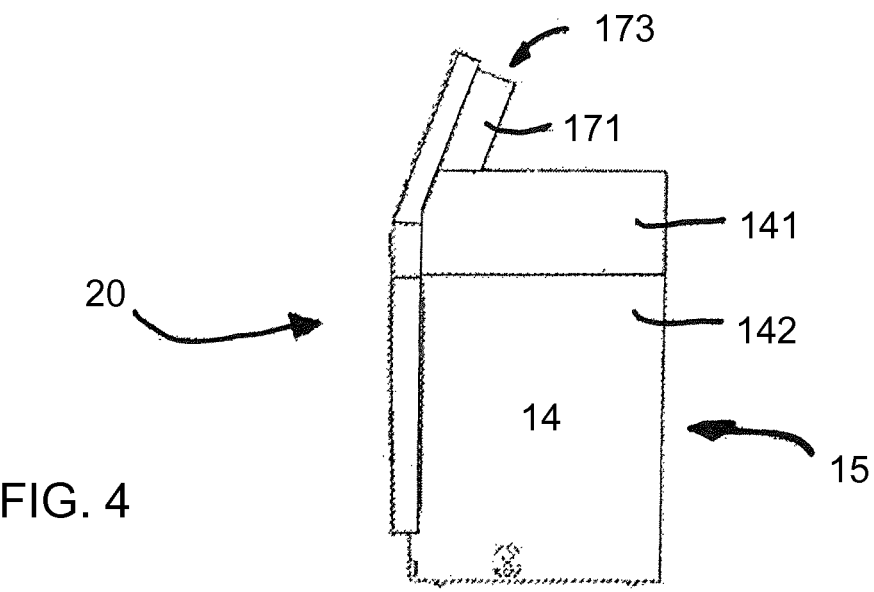
FIG. 4 is a right side view of the ATM of FIG. 1.
Figure 5:
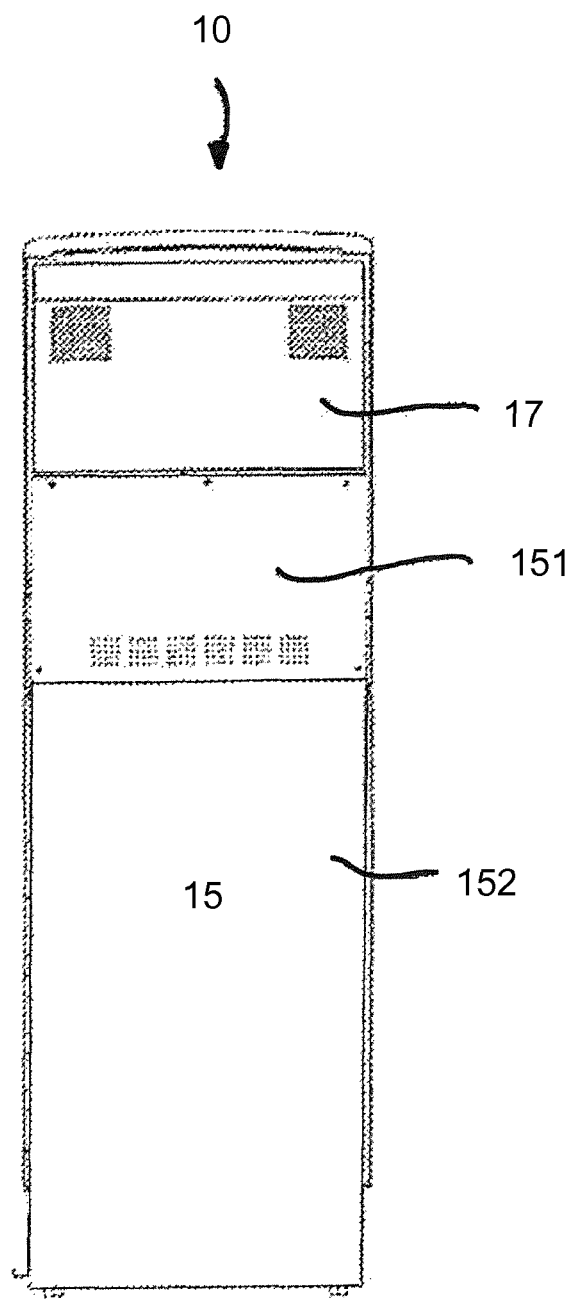
FIG. 5 is a rear view of the ATM of FIG. 1.
Figure 6:
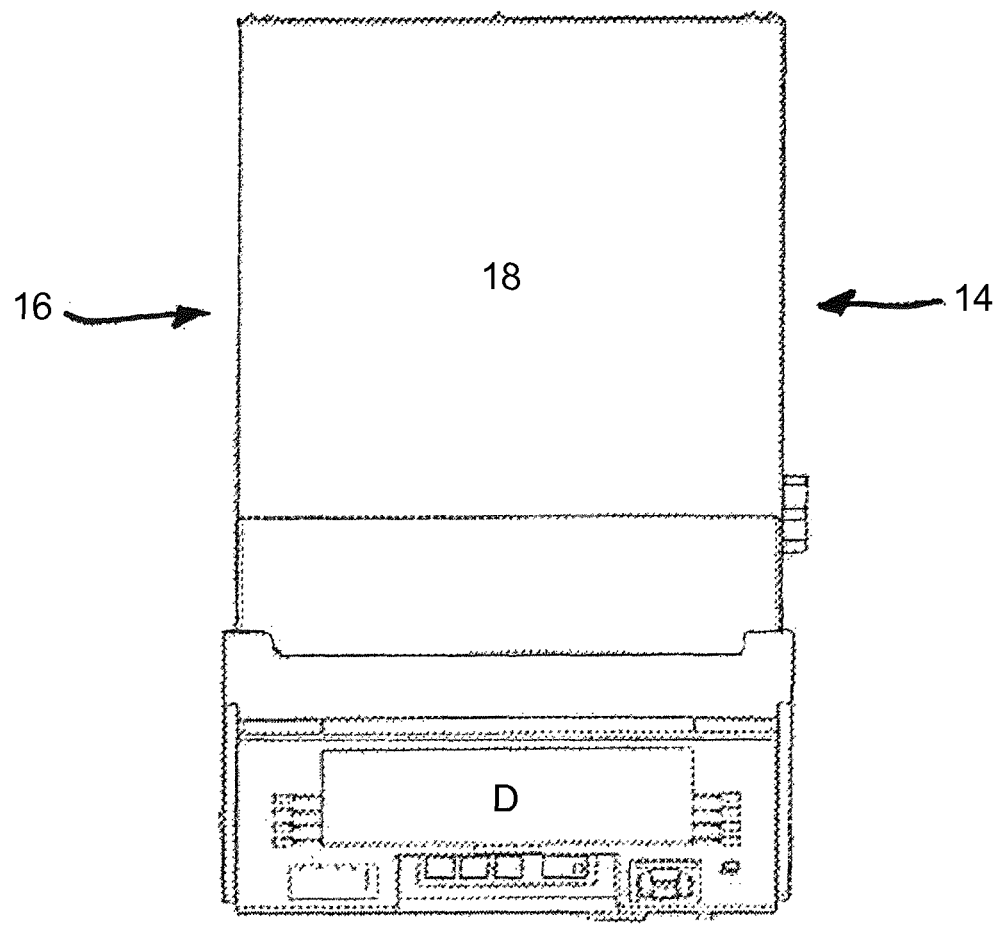
FIG. 6 is a top view of the ATM of FIG. 1.
Figure 7:
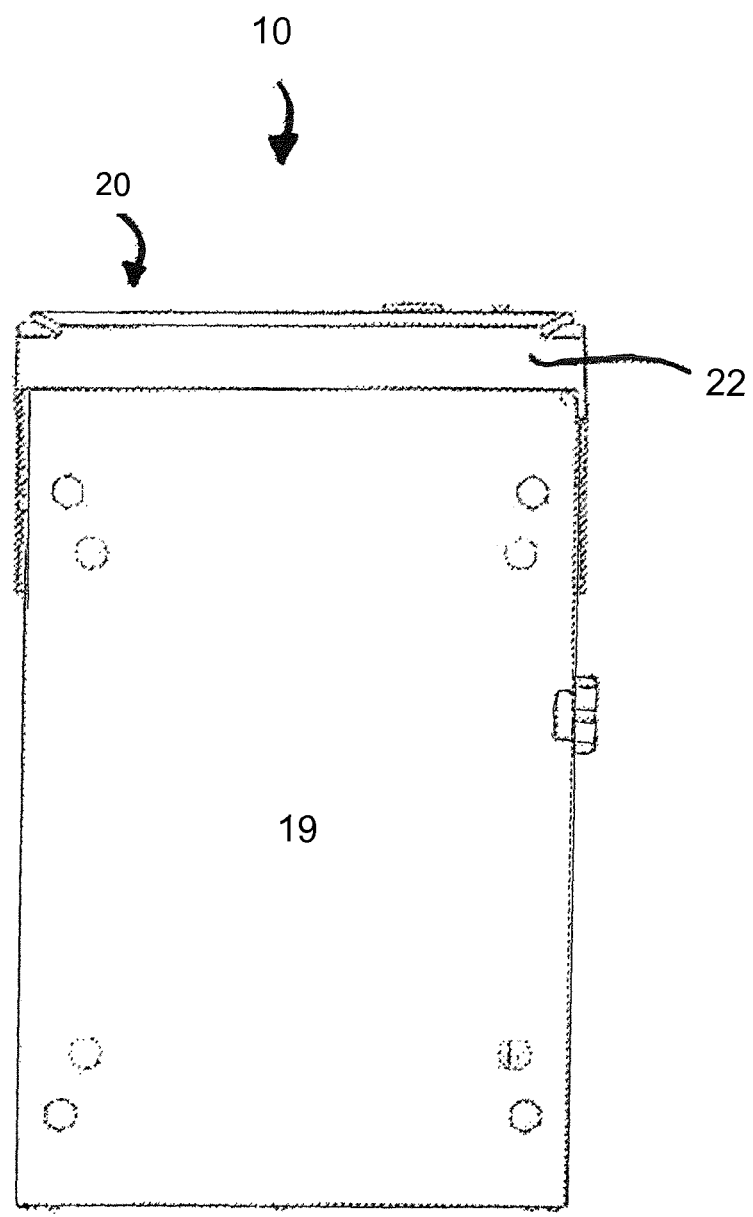
FIG. 7 is a bottom view of the ATM of FIG. 1.
Figure 8:
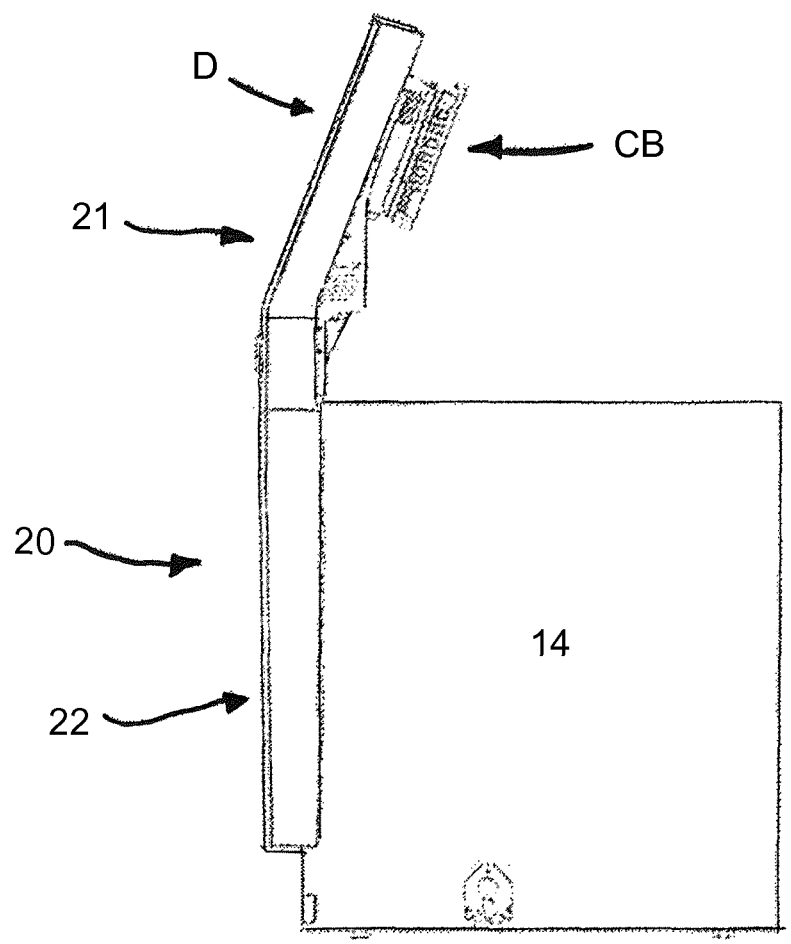
FIG. 8 is a side view of the ATM of FIG. 1 shown with a portion of the housing removed.

Referring now to the drawings, there is illustrated in FIGS. 1-8, an Automated Transaction Machine (ATM) indicated generally at 10. A housing or cabinet indicated generally at 12, includes generally parallel side panels 14 and 16, a rear panel 15, a top panel 18, a bottom panel 19, and a front fascia 20, which projects or extends from a front of the housing 12. The side panels 14, 16 and rear panel 15 may be further divided into sub-panels 141, 151, 161, which cover an upper unit portion UU of the ATM 10, and sub-panels 142, 152, 162, which cover the lower unit portion LU of the ATM 10. The lower unit LU may be a chest or safe, such as for example a UL 13 mm safe formed as the lower unit LU of the housing 12, with currency cassettes located within the chest or safe. Also located within the housing 12, preferably within the upper unit UU, are any of the devices and modules desired to carry out various self-service financial transactions for which the ATM 10 is configured, including but not limited to card reading, PIN entry and verification, transaction request and approval, currency dispense by retrieval of notes from one or more cassettes, transport and presentation of currency to the customer. Although not required, the front fascia 20 is in a preferably in two parts, upper fascia 21, and lower fascia 22, as further described.

The housing 12 includes a display housing 17 as part of the upper unit UU which extends above a main portion of the upper unit and upward from the top panel 18 of the main portion at an angle, for example in a range of 5 to 45 degrees, and at a front edge of the housing 12 against which the front fascia 20 is positioned. The display housing 17 of the housing 12 extends above the top panel 18 of the housing 12, in representative embodiments to an extent of approximately 4 inches to 20 inches. The vertical extent and angle of the display housing 17 relative to the top panel 18 may be modified to accommodate displays of various sizes, and to vary the position of the display with respect to the top panel 18 of the housing 12. The display housing 17 further includes side panels 171, 172, a top panel 173, and a rear panel 174.

A customer interface, as illustrated, may optionally include a large high-mounted display D, relative to the other proportion of the ATM housing. In at least one example, the display D may have a landscape orientation, with representative diagonal measurement in a range of 15 to 19 inches diagonal, and approximate or representative width dimension in a range of 17 to 19 inches, height dimension in a range of 12 to 15 inches, and depth dimension in a range of 2 to 3 inches. As further described, the display D may be located at an uppermost and forward region of the ATM 10 and at an optimum viewing angle, for the average user, while complying with public access requirements and laws. In a preferred embodiment, a display screen D of the customer interface has a surface area of approximately one-third the total surface area of a front fascia of the ATM 10, with a majority of the display D extending above the main portion of the upper unit UU.

The customer interface preferably includes each of the devices, components or modules of the ATM 10 with which a user of the ATM 10 interacts, including the display D such as for example a 15 inch XGA color display, input buttons 51, a keypad 52 such as an encrypted key pad, a card reading devices 53A and 53B, which may include contactless card reader, EMV-ready card reader ActivEdge™ by Diebold, Inc., MCR or Dip, a receipt printer dispensing port 54, wireless communication device such as a near-field device reader 55, and audio output jack 56, one or more cameras or mirrors, a currency dispense or presenter opening 57 which may be bundle dispense, biometric scanner 58 or other devices or modules operative by or through the customer interface as desired. Other and additional devices may optionally be included in the customer interface, and in locations other than as illustrated. In other embodiments of the ATM 10, the currency dispense opening 57 may alternatively be a deposit opening of deposit module, such as a mixed media or intelligent deposit module or "mixed deposit module" operative to both accept items for deposit, including currency and other documents, and to dispense currency or documents.

In the illustrated embodiment, substantially all of the customer interface devices, with the exception of the currency dispense opening 57, are located in an upper region of the ATM 10, and within the area defined by the upper fascia 21. A substantial portion of the display D, and associated electronics as further described, is located in an uppermost region of the ATM 10, and aligned with the display housing 17 and above or substantially above the top panel 18 of the housing 12. The display D is thus encapsulated by the display housing and uppermost region of the upper fascia 21, which defines a frame opening that surrounds the screen of the display D. By this arrangement, the display D is located in the uppermost region of the entire ATM 10 at a maximum height without increasing the total height of the housing 12, i.e. height of top panel 18, and is oriented at an optimum viewing angle without substantial reduction in the interior volume of the housing 12. Also, the location and angled orientation of the display D of this ATM 10 configuration is adaptable to compliance with various laws and regulations for public access to and operation of the ATM 10 by persons with various types of disabilities or special physical requirements, as governed for example in the United States by the Americans With Disabilities Act (ADA). For example, a representative dimension for the location of the top of the display D from ground level is approximately 55 inches (1402 mm) or within a range of approximately 1200 mm to 1400 mm. Approximate location of the currency dispense opening 57 from ground level is in a range of 700 mm to 750 mm.

The display D is in this embodiment preferably an All-In-One (AIO) type display, with a diagonal dimension of 15 inches with standard brightness or sunlight viewable, landscape display, touch screen enabled, function key interface and privacy filter available in a high performance platform using an Intel i5 processor or alternatively an Intel Atom processor, also referred to as AIO PC. It is also contemplated that the ATM 10 could include a control electronics package separately coupled with the display D to form the AIO PC/Display. The processor and other associated electronics of the AIO PC may be mounted on a circuit board, such as a printed circuit board, CB, or other structure that is located proximate to a backside of the display and within the display housing 17. These electronics may include USB connections for security cameras mounted in the customer interface, for example in the upper fascia 21, and display touch screen control, digital visual interface (DVI) input/output, and Ethernet connection. This combined configuration of the AIO PC display and control electronics, and its location in the display housing 17 as described extending above the top panel 18 of the housing 12 may provide certain advantages over prior art terminal designs. The location of the display and control electronics in the display housing 17 or substantially within the display housing 17 eliminates the need to locate the electronics in the upper unit UU within the housing 12 sub-panels 141, 151, 161 and top panel 18. This allows for additional space in the portions of the upper unit UU where required for the customer interface devices and associated electronics, such as, including the keypad, card reader, and receipt printer/dispenser. Also, by locating the display electronics in close or closest proximity to the display D, internal wiring requirements are reduced or eliminated and the ATM 10 is less susceptible to wiring damage. Also, locating the display electronics in the display housing 17 can provide lower ambient and operating temperature than within the remainder of the upper unit UU, as promoted for example by ventilation through the rear panel 174 of the display housing 17, and does not compromise the security of the ATM 10. The display D and associated electronics may be accessible for service purposes by removal of the rear panel 174 of the display housing 17 or removal of the other described panels or upper fascia 21.

Additional advantages of the customer interface include customization options for different financial institutions. For example, the upper fascia 21 and/or lower fascia 22 can be fabricated of molded of high-strength, high-performance polymeric material that resists scuffs, abrasion, breakage, or marking. In-mold labeling technology can be employed in injection mold manufacturing of the upper fascia 21 and/or the lower fascia 22 for coloration, design, branding and logos and other information or indicia on any surface area or the entire surface area of the upper fascia 21 or lower fascia 22. For example, when the upper fascia 21 and lower fascia 22 are molded in the same or complementary colors or themes, substantially the entire front surface of the ATM 10 serves to display the branding of the ATM 10 owner or operator or financial institution. This appearance can be changed by replacement of the front fascia 20 with a different in-mold applied scheme or design. The use of in-mold labeling technology in the manufacture and design of self-service terminals provides the substantial advantages of distinctive identification of terminals specific to financial institutions and other operators, resistance to damage or diminishment of appearance from normal wear and environmental factors, and the ability to completely re-configure the appearance of terminals by replacement of the fascia. Also, the external configurations of the upper fascia 21 and/or lower fascia 22 may be altered or modified while remaining compatible with the customer interface and terminal functions as described. In addition to improved appearance and resistance to damage, in-mold labeling of the terminal fascia allows for a large degree of customization for different applications and different financial institutions.

Figure 9:
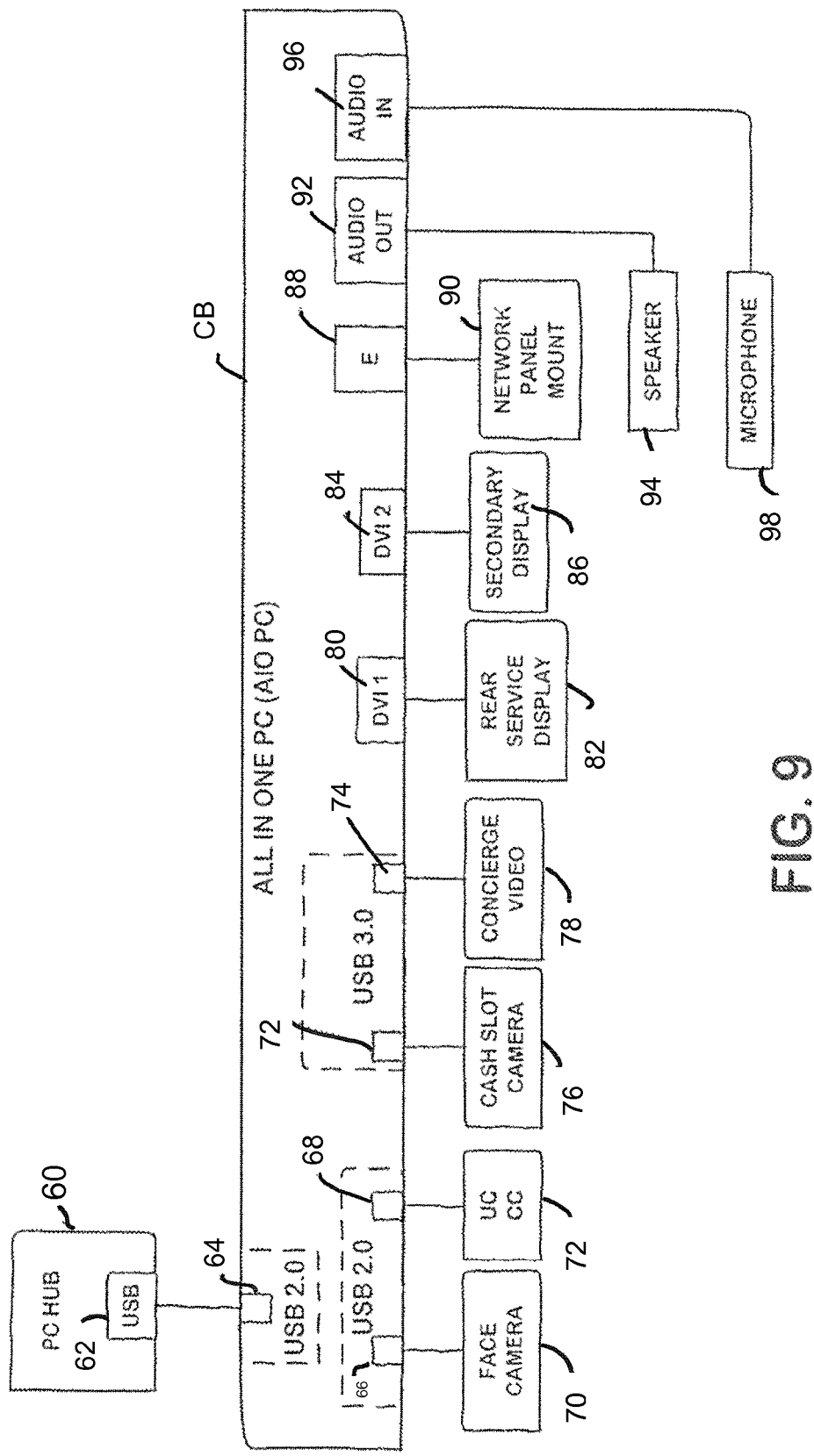
FIG. 9 is a partial schematic diagram of the electronics of the ATM of FIG. 1.

FIG. 9 is a circuit diagram for the terminal electronics CB or All In One (AIO) PC. The AIO PC receives power from a power controller hub 60. A USB 2.0 port 62 in PC Hub 60 is coupled to a USB 2.0 port 64 in the AIO PC. USB ports 2.0 ports 66 and 68 are coupled to a face camera 70 and an Upper Chassis Control Card (UCCC) 72 respectively. USB 3.0 ports 72 and 74 are coupled with a cash slot camera 76 and a concierge video (input) 78 respectively. Digital Video Interface (DVI) 1 80 is coupled with a rear service display 82 and DVI 2 84 is coupled with a secondary display 86. In an example embodiment, secondary display 86 can be used to output concierge video signals from a remote source. Ethernet (E) ort 88 is coupled with a network panel mount 90 that enables the self-service financial transaction terminal to be coupled with a network. Audio output (Out) 92 is coupled with a speaker 94 and Audio Input (IN) 96 is coupled with a microphone 98.

While principles and modes of operation have been explained and illustrated with regard to particular embodiments, it must be understood, however, that this may be practiced otherwise than as specifically explained and illustrated without departing from its spirit or scope.

What is claimed is:
1. An Automated Transaction Machine (ATM) comprising:
   a housing with:
      a lower unit forming a chest with currency cassettes disposed therein, and
      an upper unit including a main portion having a top panel, the top panel forming an exterior panel of the housing, with a transport module for the transport of currency between the cassettes and an opening in the housing which is part of a customer interface, the opening disposed in the upper unit, and
      a display housing having a rear panel with at least a portion of the display housing extending above the top panel;

a display disposed within the display housing with at least a portion of the display extending above the top panel; and a control electronics package disposed in the display housing between the display and the rear panel and including a processor and a plurality of input/output ports.

2. The ATM of claim 1 where the plurality of input/output ports includes at least one of a USB port, a video port, an audio port, and a network port.

3. The ATM of claim 2 where the control electronics package includes a circuit board upon which the processor and the at least one of the USB port, the video port, the audio port and the network port are mounted.

4. The ATM of claim 1 where the control electronics package is located proximate to a backside of the display.

5. The ATM of claim 4 where the control electronics package is located in an uppermost region of the display housing.

6. The ATM of claim 1 further comprising a power control hub disposed in the display housing and electrically connected to the control electronics package.

7. The ATM of claim 6 where the power control hub and the control electronics package are electrically connected via a USB port on the power control hub and a USB port on the control electronics package.

8. The ATM of claim 1 where the display and the control electronics package are separate modules coupled together.

9. The ATM of claim 1 where the display and the control electronics package are integrally formed.

10. The ATM of claim 1 where the display is angled in a range of 5 to 45 degrees relative to a front edge of the housing.

11. The ATM of claim 10 where a majority of the display extends above the top panel of the main portion.

12. The ATM of claim 10 where the display housing extends above the top panel of the housing at least approximately 4 inches to 20 inches.

13. The ATM of claim 1 where the rear panel is a removable rear panel that provides access to the control electronics package.

14. The ATM of claim 1 further comprising a front fascia attached to the housing which extends over at least a portion of the display housing and a portion of the upper unit.

15. The ATM of claim 14 where the front fascia further extends over at least a portion of the lower unit.

16. The ATM of claim 14 where the front fascia is includes an upper fascia and a lower fascia.

17. The ATM of claim 16 where the upper fascia includes an opening for the display and at least one opening for at least one customer interface device, and the lower unit includes at least one opening for access to a dispense module.

18. The ATM of claim 1 further comprising a plurality of devices to carry out self service financial transactions disposed in the upper unit, where the devices includes at least one of a card reader, a PIN entry device, a verification module, a transaction request module, an approval module, and a currency dispenser.

* * * * *